(12) United States Patent
Benevelli et al.

(10) Patent No.: US 11,820,445 B2
(45) Date of Patent: Nov. 21, 2023

(54) HYDRAULIC ARRANGEMENT FOR HYBRID PRIORITY VALVE

(71) Applicant: CNH Industrial America LLC, New Holland, PA (US)

(72) Inventors: Alessandro Benevelli, Albinea (IT); Francesco Pintore, Modena (IT)

(73) Assignee: CNH Industrial America LLC, New Holland, PA (US)

(\*) Notice: Subject to any disclaimer, the term of this patent is extended or adjusted under 35 U.S.C. 154(b) by 472 days.

(21) Appl. No.: 17/266,279

(22) PCT Filed: Jul. 16, 2019

(86) PCT No.: PCT/EP2019/069100
§ 371 (c)(1),
(2) Date: Feb. 5, 2021

(87) PCT Pub. No.: WO2020/030388
PCT Pub. Date: Feb. 13, 2020

(65) Prior Publication Data
US 2021/0300466 A1 Sep. 30, 2021

(30) Foreign Application Priority Data

Aug. 6, 2018 (IT) .......................... 102018000007889

(51) Int. Cl.
*B62D 5/07* (2006.01)
*B60T 15/02* (2006.01)
*B62D 5/08* (2006.01)
*B62D 5/09* (2006.01)

(52) U.S. Cl.
CPC ............ *B62D 5/075* (2013.01); *B60T 15/028* (2013.01); *B62D 5/08* (2013.01); *B62D 5/091* (2013.01)

(58) Field of Classification Search
CPC ........ F15B 2211/6051; F15B 2211/781; F15B 11/168; F15B 2211/6054; F15B 11/162; B62D 5/075
See application file for complete search history.

(56) References Cited

U.S. PATENT DOCUMENTS

| | | | |
|---|---|---|---|
| 6,644,025 B1* | 11/2003 | Oberhausser | F15B 11/163 60/446 |
| 9,084,388 B2* | 7/2015 | Bitter | F15B 11/162 |
| 2014/0129035 A1* | 5/2014 | Marquette | B62D 5/075 700/282 |
| 2019/0194006 A1* | 6/2019 | Matsuo | B62D 5/07 |

\* cited by examiner

*Primary Examiner* — Abiy Teka
(74) *Attorney, Agent, or Firm* — Rickard DeMille; Rebecca Henkel

(57) ABSTRACT

A hydraulic arrangement for distributing a fluid in pressure coming from a source among multiple hydraulic units of a work vehicle. At least one of the hydraulic units provides an electronic load sensing signal and of the hydraulic units provides a hydraulic load sensing signal. The hydraulic arrangement includes a priority valve configured to divide the flow of fluid between the hydraulic units. The priority valve and source are hydraulically controlled by a first hydraulic load sensing signal resulting as the greatest of a plurality of hydraulic load pressure signals taken from the hydraulic unit. The hydraulic arrangement also includes a conversion unit configured to transform an electronic load sensing signal of at least one of the hydraulic units in an equivalent hydraulic load sensing signal so as to define the first hydraulic load sensing signal.

12 Claims, 3 Drawing Sheets

HYDRAULIC ARRANGEMENT FOR HYBRID PRIORITY VALVE

CROSS REFERENCE TO RELATED APPLICATIONS

This application is a U.S. National Stage filing of International Application Serial No. PCT/EP2019/069100 entitled "HYDRAULIC ARRANGEMENT FOR HYBRID PRIORITY VALVE," filed Jul. 16, 2019, which claims priority to Italian Application Serial No. 102018000007889, filed Aug. 6, 2018, each of which is incorporated by reference herein in its entirety for all purposes.

TECHNICAL FIELD

The present invention concerns a hydraulic arrangement for a work vehicle, in particular a hydraulic arrangement comprising a hybrid priority valve for a work vehicle, such as an agricultural vehicle.

BACKGROUND OF THE INVENTION

Work vehicles uses a fluid in pressure, e.g. oil, to operate a plurality of elements of the vehicles, such as transmission, steering, brakes and auxiliary valves.

To this aim, it is provided a source of such fluid in pressure, e.g. a pump, configured to supply the fluid into a distribution circuit configured to distribute the fluid in pressure among the aforementioned elements in function of their hydraulic load.

As disclosed in FIG. 1, a known distribution circuit 1' for a work vehicle comprises a source of fluid 2' directly fluidly connected to a steering unit 3' of the work vehicle via a conduit 4' and fluidly connected to brake valve unit 5' and auxiliary valves unit 6' via a priority valve 7' fluidly interposed on a conduit 8'.

Priority valve 7' may be a three ways proportional valve configured to divide the fluid coming from source 2' between brake valve unit 5' via conduit 8a' and auxiliary valves unit 5' via conduit 8b'. Such division corresponds to the five positions of the valve, i.e. a first positions in which no fluid may flow and therefore only steering unit 3' is using the fluid coming from source 2', a second and a third position in which fluid may flow to only brake valve unit 5' and steering unit 3' and a fourth and fifth position in which fluid may flow to all units 3', 5' and 6'.

Valve 7' is controlled hydraulically thanks to a pair of hydraulic load pressure signals acting on opposite sides of valve 7', a first signal 11' taken from conduit 8' upstream with respect to valve 7' and a second signal 12' taken as the greatest between signals coming from steering unit 3', brake valve unit 5', auxiliary valves unit 6'. Such greatest signal is chosen by selecting the greatest between a signal 12a' coming from brake valve unit 5' and a signal 12b' coming from steering unit 3' and then comparing such greatest signal with a signal 12c' coming from auxiliary valves unit 6'. Such comparison is made by respective shuttle valves 13' connecting signals 12a' and 12b' and the output between these latter with signal 12c'.

The balance between signal 11' and 12' allows valve 7' to be moved so as to be positioned in one of the above described positions. Since 11' is taken directly on conduit 8 upstream to steering unit 3', more such signal is greater, more fluid will pass to units 5' and 6', and, reversely, more signal 12' is greater, less fluid will pass to units 5' and 6', till such fluid will be zero.

A signal 14' derives from signal 12' coming from shuttle valve 13' and flows to source 2'. Source 2' is configured to increase pressure of provided fluid according to the received load sensing signal 14'. For example, source 2' may be a load sensing pump.

However new typologies of valves 6' do no more provide a hydraulic load signal but an electric load signal; therefore the traditional distribution circuits are no more suitable for achieving their scope.

Moreover, since steering unit 3' and valve unit 5' need to maintain hydraulic control for safety reasons, it is better not to transform all the elements of distribution circuit in electrically-controlled ones.

Therefore, in view of the above, the need is felt of a distribution circuit for distributing the fluid in pressure among hydraulic elements of a work vehicle in function of their load, which can be used also with new elements having only electric load sensing signals.

An aim of the present invention is to satisfy the above mentioned needs.

SUMMARY OF THE INVENTION

The aforementioned aim is reached by a hydraulic arrangement as claimed in the appended set of claims.

BRIEF DESCRIPTION OF DRAWINGS

For a better understanding of the present invention, a preferred embodiment is described in the following, by way of a non-limiting example, with reference to the attached drawings wherein.

DETAILED DESCRIPTION OF THE INVENTION

Figure 1:
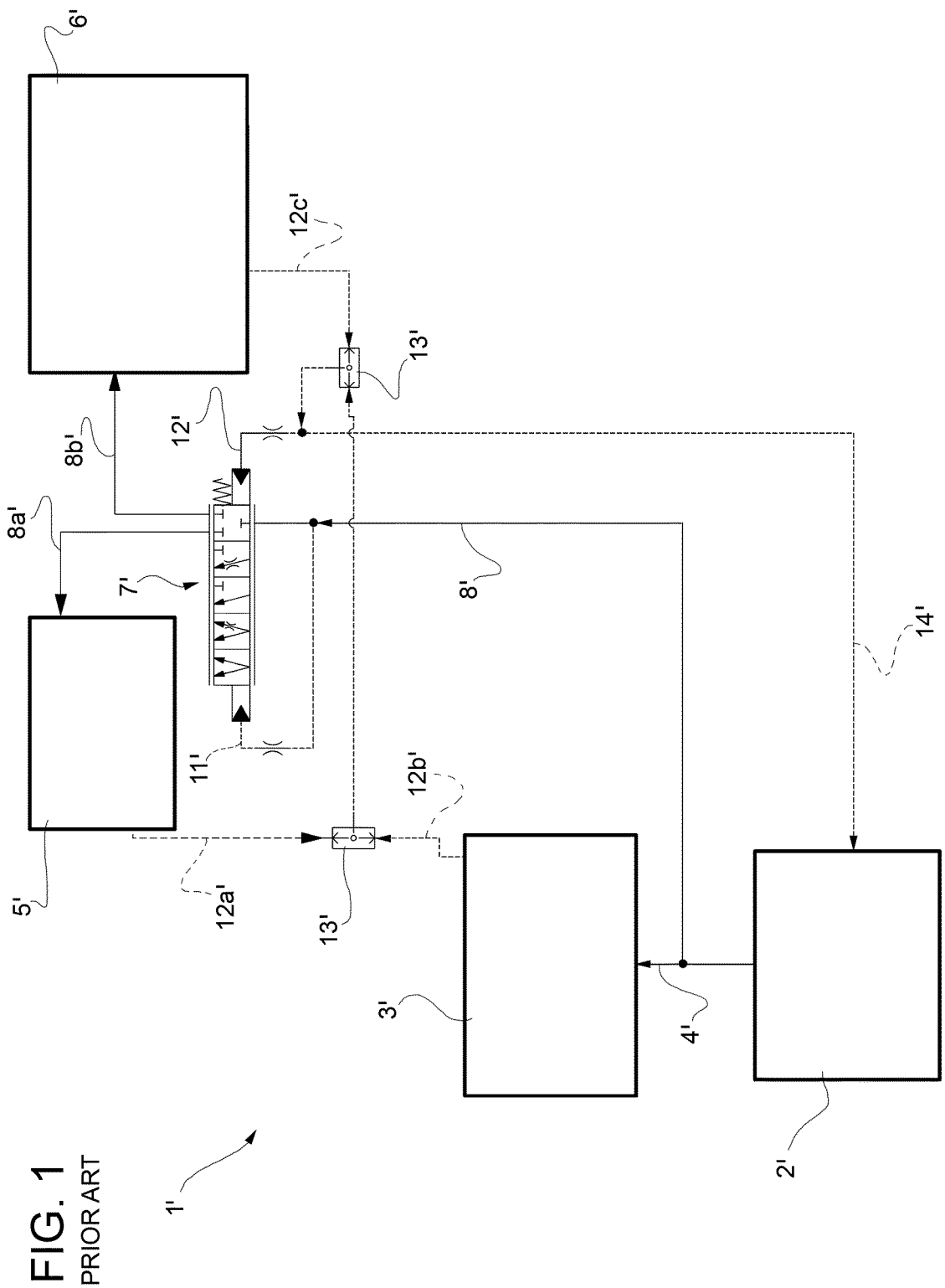
FIG. 1 is a hydraulic scheme showing a distribution circuit for a work vehicle as known in the art.
Figure 2:
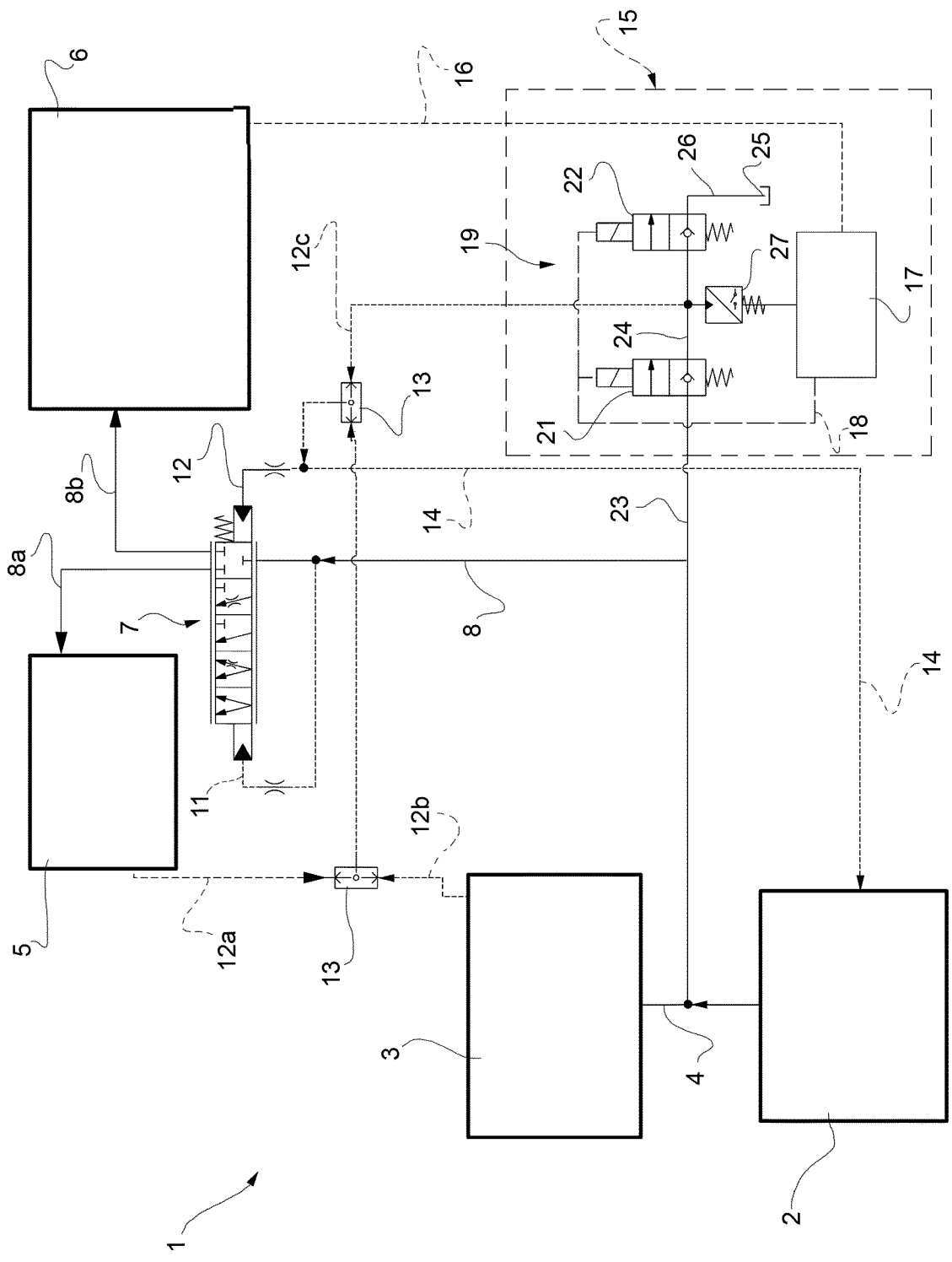
FIG. 2 is a hydraulic scheme showing a distribution circuit for a work vehicle according to the present invention.

FIG. 1 discloses a distribution circuit 1 for a work vehicle comprises a source of fluid 2 directly fluidly connected to a steering unit 3 of the work vehicle via a conduit 4 and fluidly connected to brake valve unit 5 and auxiliary valves unit 6 by a conduit 8 on which it is fluidly interposed a priority valve 7.

Priority valve 7 may be a three ways—five positions proportional valve configured to divide the fluid coming from source 2 between brake valve unit 5 via conduit 8a and auxiliary valves unit 6 via conduit 8b. Such division corresponds to the five positions of the valve, i.e. a first position in which no fluid may flow and therefore only steering unit 3 is using the fluid coming from source 2, a second and a third positions in which fluid may flow to only brake valve unit 5 and steering unit 3 and a fourth and fifth position in which fluid may flow to all units 3, 5 and 6.

Valve 7 is controlled hydraulically thanks to a pair of hydraulic load pressure signals acting on opposite sides of valve 7, a first signal 11 taken from conduit 8 upstream with respect to valve 7 and a second signal 12 taken as the greatest between signals coming from steering unit 3, brake valve unit 5, auxiliary valves unit 6. Such greatest signal is chosen by selecting the greatest between a signal 12a coming from brake valve unit 5 and a signal 12b coming from steering unit 3 and then comparing such greatest signal with a signal 12c coming from auxiliary valves unit 6. Such comparison is made by respective shuttle valves 13 connecting signals 12a and 12b and the output between these latter with signal 12c.

A signal 14 derives from signal 12 coming from shuttle valve 13 and flows to source 2. As known, source 2 is configured to increase pressure of provided fluid according to the received load sensing signal 14. For example, source 2 may be a load sensing pump.

The balance between signal 11 and 12 allow valve 7 to be moved so as to be positioned in one of the above described positions. Since 11 is taken directly on conduit 8 upstream to steering unit 3, more such signal is greater, more fluid will pass to units 5 and 6, and, reversely, more signal 12 is greater, less fluid will pass to units 5 and 6, till such fluid will be zero.

According to the invention, distribution circuit 1 comprises a conversion unit 15 configured to receive as input an electronic load sensing signal 16 representing a hydraulic load pressure of a hydraulic unit, e.g. auxiliary valve unit 6, and to produce, on the base of such electronic load sensing signal 16, an equivalent hydraulic load sensing signal 12c.

According to a preferred embodiment of the present invention, conversion unit 15 may comprise an ECU 17 electrically connected to auxiliary valve unit 6 and comprising memorizing and elaboration means configured to receive electronic load sensing signal 16 and to elaborate an output electric signal 18 based on such configured to control at least a valve 19 as described hereunder.

According to the described example conversion unit 15 comprises a pair of valves, namely a first valve 21 and a second valve 22; first valve 21 is fluidly connected to conduit 8 via a conduit 23 and to second valve 22 via a conduit 24, second valve 22 is further fluidly connected to a drain 25 via a conduit 26.

Conversion unit 15 may further comprise a sensor electrically connected to ECU 17 and configured to control the pressure value of the equivalent hydraulic load signal 12c. Such sensor may be a valve 27, e.g. a pressure valve, fluidly interposed on conduit 24 and electrically connected to ECU 17.

First and second valves 21, 22 are preferably ON-OFF two ways—two positions electro actuated valves, more preferably they can be proportional; advantageously such electrical actuation is given by a control electric signal 18 coming from ECU 17.

The operation of the distribution circuit 1 according to the present invention is the following.

Figure 3:
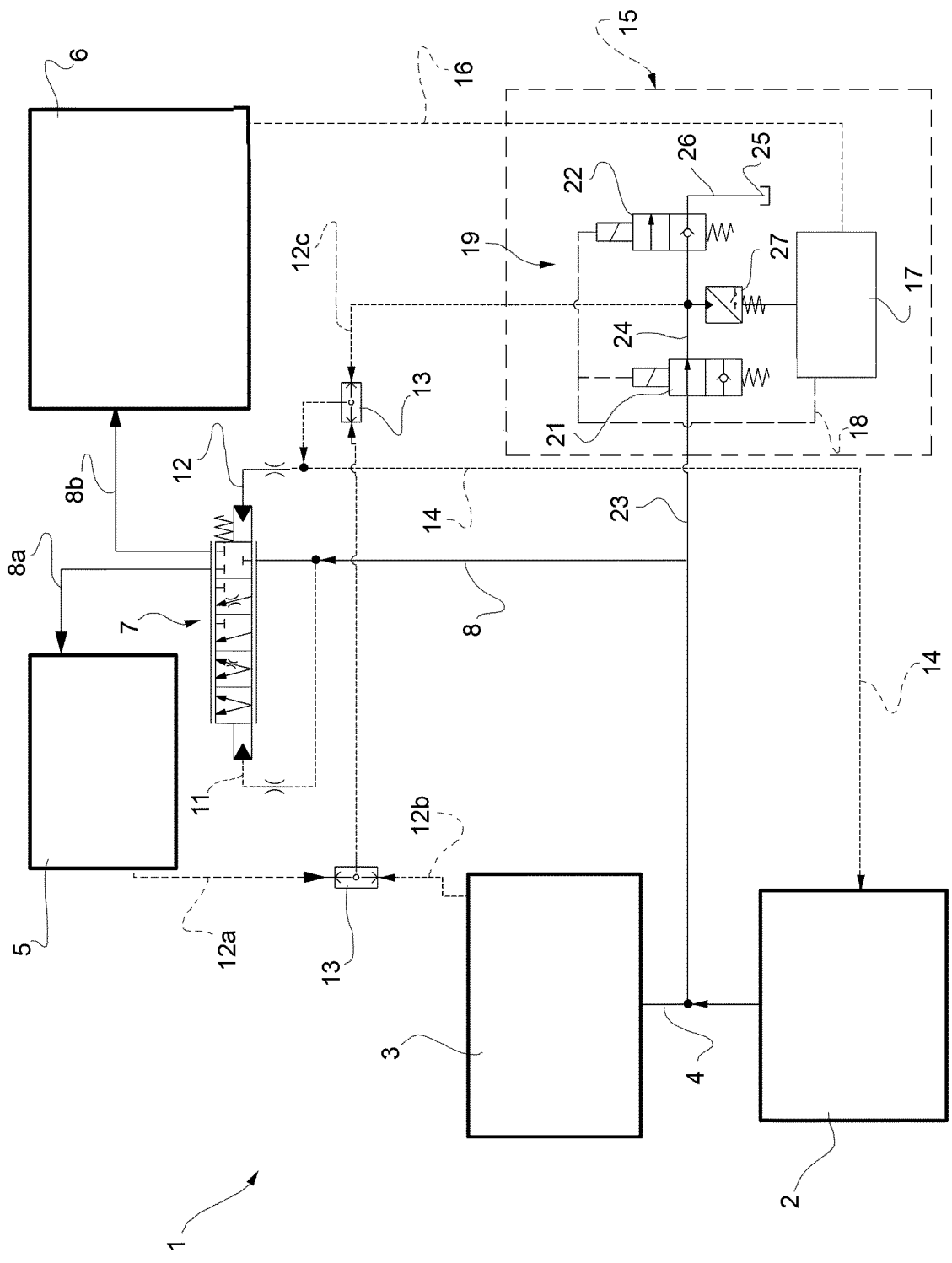
FIG. 3 is the hydraulic scheme of FIG. 2 in a different operative condition.

As disclosed in FIG. 3, valve 21 is positioned so that a part of fluid may flow from conduit 8 into conversion unit 15.

When units 3 and 5 are working, respective hydraulic load pressure signals 12a, 12b will be provided to shuttle valve 13 which will select the greatest between them; then, such signal will flow to the other shuttle valve 13 to compare with signal 12c, output of conversion unit 15. The greatest of such signals will sum with signal 14 and apply a force to valve 7 on opposite side of force applied by hydraulic load sensing signal 11, taken from conduit 8. As said above, such balance allows the movement of valve 7 which regulates flow from source 2 to units 5' and 6' from a condition in which no fluid may flow to a condition of maximum flow.

ECU 17 of conversion unit 15 receives electronic load sensing signal 16 from auxiliary valves unit 6 and elaborate this latter so as to define an equivalent hydraulic load sensing signal 12c which should be imparted to shuttle valve 13. Once the equivalent pressure value of such signal is established, ECU 17 control opening of valves 21 and 22 so as to use flow of fluid coming from conduits 8 and 23 to obtain such pressure signal. If valves are simply ON-OFF valves, ECU 17 will manage switching timing of these latter and their frequency to achieve the target pressure. In the case valves 21 and 22 are proportional ECU 17 will manage them in proportional way to achieve target pressure, i.e. keeping valve 22 closed and partial sing opening of valve 21.

Thanks to sensor valve 27, ECU 17 receives the pressure value of such signal 12c so as to control in a closed loop manner the opening of valves 21 and 22.

When no electric signal 16 comes from auxiliary valves unit 6, valve 21 is closed and valve 22 is open so as allow remaining fluid in conduit 24 to flow to drain 25 via conduit 26.

In view of the foregoing, the advantages of the hydraulic arrangement according to the invention are apparent.

Thanks to the presence of a conversion unit 15, it is possible to convert a electric signal 16 coming from a unit of a distribution circuit 1, e.g. unit 6, to a hydraulic load sensing signal 12c suitable for being used in a standard hydraulic distribution circuit.

Thanks to such conversion unit 15, it is therefore possible to allow the use of a known hydraulic distribution circuit with new electric-sensing units with few modifications.

Moreover, since some hydraulic signals are substituted by electrical ones, less pipes and less shuttle valves are needed. Therefore, dimensions, costs and noise due to the presence of such pipes and shuttle valves are reduced.

It is clear that modifications can be made to the described hydraulic arrangement which do not extend beyond the scope of protection defined by the claims.

For example, conversion unit 15 may be used for the conversion of an electric signal defining a hydraulic load pressure of another unit than auxiliary valve unit 6.

Moreover, conversion unit 15 may comprise other valves 19 than valves 21 and 22, e.g. pressure reduction valves.

Further, module 15 may be physically integrated in valve 7.

The invention claimed is:

1. A hydraulic arrangement for distributing a fluid in pressure coming from a source of fluid in pressure among a plurality of hydraulic units of a work vehicle, wherein a first hydraulic unit of the plurality of hydraulic units is configured to provide an electronic load sensing signal and a second and a third hydraulic unit of the plurality of hydraulic units are each configured to provide a first hydraulic load sensing signal and a second hydraulic load sensing signal, respectively, the hydraulic arrangement comprising:
   a priority valve configured to divide the flow of the fluid between the plurality of hydraulic units, wherein the priority valve and the source are hydraulically controlled by a fourth hydraulic load sensing signal determined as the greatest hydraulic load sensing signal among the first and the second hydraulic load sensing signals;
   a conversion unit configured to transform the electronic load sensing signal to an equivalent hydraulic load sensing signal so as to define the fourth hydraulic load sensing signal controlling priority valve and source.

2. The hydraulic arrangement according to claim 1, wherein the conversion unit comprises an ECU configured to receive the electronic load sensing signal, elaborate this latter and control on the base of such elaboration at least a valve so as to generate such equivalent hydraulic load sensing signal.

3. The hydraulic arrangement according to claim 2, wherein the conversion unit further comprises a pair of valves fluidly interposes on a conduit fluidly connected to a conduit fluidly connecting the source to the other hydraulic units, the ECU being configured to regulate the opening of the valves so as to obtain the pressure value of the equivalent hydraulic load signal.

4. The hydraulic arrangement according to claim 3, wherein the valves are ON-OFF two ways—two positions electro actuated valves.

5. The hydraulic arrangement according to any of claim 2, wherein the conversion unit further comprises a sensor electrically connected to the ECU and configured to detect the pressure value of the equivalent hydraulic load signal.

6. The hydraulic arrangement according to claim 5, wherein the sensor is a pressure valve.

7. The hydraulic arrangement according to claim 2, wherein the conversion unit is physically integrated in the priority valve.

8. The hydraulic arrangement according to claim 1, wherein the second hydraulic unit is a steering unit which is fluidly connected to the source via a conduit, the arrangement further comprising a brake valve unit and an auxiliary valve unit fluidly connected to the source via a conduit, the priority valve being fluidly interposed on conduit and controlled by a balance of a fifth hydraulic load sensing signal being directly taken on the conduit and the fourth hydraulic load sensing signal.

9. The hydraulic arrangement according to claim 1, wherein the selection of the fourth hydraulic signal is made by at least one shuttle valve.

10. The hydraulic arrangement according to claim 9, wherein the source is fluidly connected to the at least one shuttle valve so as to receive a sixth hydraulic load sensing signal equal to the fourth hydraulic load sensing signal, the source being configured to regulate the pressure fluid supplied to the plurality of units according to the sixth load sensing signal.

11. The hydraulic arrangement according to claim 10, wherein the source is a load sensing pump.

12. The hydraulic arrangement according to claim 1, wherein the priority valve is a three ways—five positions proportional valve.

* * * * *